(12) United States Patent
Wang et al.

(10) Patent No.: US 8,257,794 B2
(45) Date of Patent: Sep. 4, 2012

(54) CAPILLARY COATING DEVICES AND METHODS

(75) Inventors: An-Bang Wang, Taipei (TW); I-Chun Lin, Taipei (TW); Fei-Yau Lu, Taipei (TW); Po-Ting Pan, Taipei (TW); Yi-Hung Wu, Taipei (TW)

(73) Assignee: National Taiwan University, Taipei (TW)

( * ) Notice: Subject to any disclaimer, the term of this patent is extended or adjusted under 35 U.S.C. 154(b) by 631 days.

(21) Appl. No.: 12/398,962

(22) Filed: Mar. 5, 2009

(65) Prior Publication Data
US 2010/0047452 A1 Feb. 25, 2010

(30) Foreign Application Priority Data

Aug. 21, 2008 (TW) ................... 97131892 A

(51) Int. Cl.
*B05D 1/26* (2006.01)
(52) U.S. Cl. ................... 427/286; 427/261; 427/284
(58) Field of Classification Search ............... 427/261, 427/284, 286
See application file for complete search history.

(56) References Cited

U.S. PATENT DOCUMENTS

| | | | |
|---|---|---|---|
| 4,451,507 A | 5/1984 | Beltz et al. | |
| 4,522,691 A | 6/1985 | Suginoya et al. | |
| 4,744,635 A | 5/1988 | Takaochi et al. | |
| 4,786,148 A | 11/1988 | Sekimura et al. | |
| 4,938,994 A | 7/1990 | Choinski | |
| 5,085,973 A | 2/1992 | Shimizu et al. | |
| 5,723,176 A * | 3/1998 | Keyworth et al. | ......... 427/163.2 |
| 6,191,053 B1 | 2/2001 | Chun et al. | |
| 6,423,140 B1 | 7/2002 | Liu et al. | |
| 2008/0145537 A1 | 6/2008 | Wang et al. | |

FOREIGN PATENT DOCUMENTS

| | | |
|---|---|---|
| TW | 512242 B | 12/2002 |
| TW | 535010 B | 6/2003 |
| TW | 200702743 | 1/2007 |
| TW | 200824799 | 6/2008 |

* cited by examiner

*Primary Examiner* — Frederick Parker

(57) ABSTRACT

A discontinuous capillary coating device is disclosed. A discontinuous capillary coating device. At least one capillary tube is filled with a coating material. At least one coating substrate receives a liquid coating film. At least one capillary tube holder holds the capillary tube, guiding movement of the capillary tube. At least one traversing mechanism drives the capillary tube holder or coating substrate to move.

6 Claims, 10 Drawing Sheets

CAPILLARY COATING DEVICES AND METHODS

CROSS REFERENCE TO RELATED APPLICATIONS

This Application claims priority of Taiwan Patent Application No. 97131892, filed on Aug. 21, 2008, the entirety of which is incorporated by reference herein.

BACKGROUND OF THE INVENTION

1. Field of the Invention

The invention relates to capillary coating devices and methods, and more particularly to capillary coating devices and methods for manufacturing color filters of liquid crystal displays, color units of fluorescent layers of plasma displays, biomedical products, flexible electronic members, or cells.

2. Description of the Related Art

A flat panel display has been developed to replace a cathode-ray tube display. The flat panel display, such as a liquid crystal display, comprises a backlight source, a polarizer, a glass substrate, a liquid crystal panel, a thin-film transistor (TFT), and a color filter (CF). Specifically, the color filter plays an important role in exhibition of colored characteristics and contrast of the liquid crystal display.

The color filter of the liquid crystal display and a color unit of a fluorescent layer of a plasma display are critical components for transforming black-and-white images into colored images. For the color filter of the liquid crystal display, multiple red, green, and blue pixels are arranged on the glass substrate and every three of the pixels correspond to a pixel on the liquid crystal display. After white light passes through the red, green, and blue pixels, three primary colors, red (R), green (G), and blue (B) colors, are generated. By a grayscale effect generated by liquid crystal molecules, the three primary colors mix with each other to form diverse colors. Currently, the color filter may be manufactured using five methods, i.e. exposure development, stamping, ink-jet printing, stripe coating, and discontinuous micro-patch coating methods. As to the exposure development method, a pattern is defined by repeated coating of a flat liquid film and exposure/development steps. The exposure development method may be divided into many sub-methods including dyeing, pigment dispersion, electro deposition, etc. As to the stamping method, a stamp defines a pattern and pigments are imprinted on a substrate. As to the ink-jet printing method, a nozzle spouts tiny drops over a substrate, forming micro-patch patterns. As to the stripe coating method, various pigments are coated on a black matrix of a color filter in a stripe shape. As to the discontinuous micro-patch coating method, a discontinuously supplied fluid directly defines a micro-patch pattern.

In the aforementioned exposure development methods, coating of the flat liquid film must be provided in advance. The coating process comprises spin coating, extrusion spin coating, and slot patch coating process. For the spin coating process, such as that disclosed in U.S. Pat. No. 4,451,507, utilization of raw materials is not thorough. However, for the extrusion spin coating process (as disclosed by U.S. Pat. No. 6,191,053) and slot patch coating process (as disclosed by U.S. Pat. No. 4,938,994), utilization of the raw materials can be enhanced. As to the sub-methods of dyeing, pigment dispersion, and electro deposition, raw materials for coating the liquid film are different, thereby causing differences in manufacturing processes.

As to the dyeing method, as disclosed in U.S. Pat. No. 4,744,635, a transparent and organic sensitive material serves as an absorptive layer and a pattern is processed by a litho/etching technique. The absorptive layer is then immersed in a dye solution to be dyed. To obtain the pattern with red (R), green (G), and blue (B) colors, the aforementioned process must be performed by triple coating, exposure, dyeing, roast, and anti-dyeing steps. Accordingly, as the dyeing method provides complex steps and requires expensive instruments or equipment and the heat-resistant and light-resistant properties of dyes are poor, the dyeing method is limited to manufacture of small liquid crystal display panels and cathode-ray tubes.

The pigment dispersion method, as disclosed in U.S. Pat. Nos. 5,085,973 and 4,786,148, is commonly used to manufacture the color filters. The pigment dispersion method employs sensitive and heat-hardened pigments and comprises the following steps: coating a coloring material on a glass substrate; performing exposure, development, and roast operations to form a monochromatic patch; and repeatedly performing exposure, development, and roast operations to form R, G, and B pixels. Nevertheless, the pigment dispersion method provides complex steps and requires expensive equipment, utility rate of the coloring material is low, and variability of the pixels and pattern is poor. Accordingly, the pigment dispersion method cannot be applied to manufacture of large panels and conform to low-price demands.

As to the electro deposition method, as disclosed in U.S. Pat. No. 4,522,691, a transparent and patterned conductive film is formed on a glass substrate and a film formed of a coloring material is formed on the transparent and patterned conductive film using an electrophoresis technique. After the aforementioned process is repeated three times, a pattern with R, G, and B colors can be obtained. Nevertheless, as the electro deposition method requires many processing parameters, productivity cannot be easily controlled. Specifically, because of the transparent and patterned conductive film, light permeability and definition of the pattern is insufficient. Additionally, arrangement of the pattern is limited, such that a color filter with a complicated pattern cannot be produced.

Regarding the exposure development method, as the pattern cannot be directly defined during coating and excessive raw materials must be removed by an exposure/development step, utility rate of the raw materials is less than one-third. Thus, the exposure development method cannot be applied to mass production and conform to reduction of manufacturing costs.

As to the stamping method, as disclosed in Taiwan Patent No. 535010, a stamp or a printing board with a micro-structural pattern is stained with a dye and is stamped on a substrate, forming the micro-structural pattern thereon. The micro-structural pattern is then roasted. After the aforementioned process is repeated three times, a pattern with R, G, and B colors can be obtained. Although the stamping method can enhance the utility rate of the raw materials and reduce the manufacturing costs, variability of the pattern is still insufficient. Accordingly, arrangement of pixels cannot be randomly changed.

As to the ink-jet printing method, as disclosed in Taiwan Patent No. 512242, a pattern can be determined by directly controlling the position of nozzles. The ink-jet printing method comprises the following steps: coating an absorptive layer on a glass substrate, securing ink drops to the glass substrate; and spouting red, green, and blue ink over the glass substrate with the nozzles, forming a required pattern. By using the inkjet printing method, utility rate of raw materials and variability of the pattern are promoted. Each ink drop must be accurately spouted over a micrometer-size area or an area with a smaller size. Nevertheless, as airflows easily interfere with flight of the ink drops, the ink drops are often spouted over other patches, contaminating the other patches. Thus, a machine required for spouting the ink drops must provide high positioning precision and the moving speed thereof is limited. Moreover, each nozzle can spout only one ink drop at a time, such that the productivity cannot be enhanced. To solve the aforementioned problem, the number of the nozzles must be increased, thereby causing increased manufacturing costs. When ink-spouting operation is performed, all the nozzles must be maintained in a good condition and must not be obstructed. When the inkjet printing method is applied to manufacture of the large panels, the size of the machine required for spouting the ink drops is enlarged and mobility and uniformity of the machine must be maintained.

The stripe coating method is an improved slot coating method. As to the stripe coating method, various pigments are coated on a black matrix in the form of stripes, forming R, G, and B stripes. For example, U.S. Pat. No. 6,423,140 discloses a slot coating method using multiple guiding plates for a coating mold. Stripes composed of three fluids can be obtained using the slot coating method. Specifically, the three fluids are input to multiple channels of the coating mold via three inlets thereof. The three fluids gather on one side through the guiding plates, forming the stripes. Nevertheless, the coating mold must be provided with high precision. Additionally, flow of the three fluids is not easily controlled, thereby causing mixing therebetween. Moreover, Taiwan Patent Publication No. 200702743 discloses a stripe coating method and mechanism for manufacturing the color filter. The stripe coating mechanism comprises a coating mold with multiple tiny outlets arranged in a single row. A fluid flows into the coating mold. By relatively moving a coating substrate, multiple parallel monochromatic stripes are coated on the color filter. Nevertheless, as the coating mold is provided with various channels for generating the stripes, resistance caused by the fluid is significantly high. Thus, a fluid supply source must be provided in the stripe coating mechanism to transport the fluid. Moreover, as the profile of the channels in the coating mold is fixed, the gaps between the coated parallel stripes are fixed, resulting in low variability of a pattern.

Taiwan Patent Publication No. 200824799 and U.S. Patent Publication No. 20080145537 disclose a discontinuous micro-patch coating device. Continuous coating operation and a discontinuously supplied fluid define a micro-patch pattern. The discontinuously supplied fluid is a micro multiphase fluid composed of multiple primary fluids and a secondary fluid. The coating operation is performed by the primary fluids. The secondary fluid cuts off the primary fluids and may comprise a gas. By controlling the volume and length of the primary and secondary fluids, the micro-patch pattern can be controlled. Nevertheless, as the aforementioned coating operation requires a plurality of fluid supply sources and the flow of the fluids must be precisely controlled, overall control of the coating operation is complex and equipment costs are relatively high.

Hence, there is a need for a capillary coating device and method, solving the aforementioned problems.

BRIEF SUMMARY OF THE INVENTION

A detailed description is given in the following embodiments with reference to the accompanying drawings.

An exemplary embodiment of the invention provides a discontinuous capillary coating method comprising: providing at least one capillary tube, at least one capillary tube holder, at least one traversing mechanism, and at least one coating substrate; filling the capillary tube with a coating material and disposing the capillary tube on the capillary tube holder; activating the traversing mechanism to enable the capillary tube to approach the coating substrate, thereby allowing the coating material in the capillary tube to contact the coating substrate; moving the capillary tube holder or coating substrate by the traversing mechanism, wherein a coating operation is performed, and a liquid film on the coating substrate is formed; and activating the traversing mechanism to separate the capillary tube from the coating substrate, thereby cutting off a liquid bridge between the coating material and the liquid film, and forming at least one discontinuous liquid film.

Another exemplary embodiment of the invention provides a discontinuous capillary coating device comprising at least one capillary tube, at least one coating substrate, at least one capillary tube holder, and at least one traversing mechanism. The capillary tube is filled with a coating material. The coating substrate receives a liquid coating film. The capillary tube holder holds the capillary tube, thereby guiding movement of the capillary tube. The traversing mechanism drives the capillary tube holder or coating substrate to move.

Yet another exemplary embodiment of the invention provides a continuous capillary coating method comprising: providing at least one capillary tube, at least one capillary tube holder, at least one fluid reservoir, at least one traversing mechanism, and at least one coating substrate; disposing the capillary tube on the capillary tube holder; connecting the capillary tube to the fluid reservoir; activating the traversing mechanism to enable the capillary tube to approach the coating substrate, thereby allowing a coating material filled in the capillary tube to contact the coating substrate; moving the capillary tube holder or coating substrate by the traversing mechanism, wherein a coating operation is performed, and a continuous liquid film is formed.

Still another exemplary embodiment of the invention provides a continuous capillary coating device comprising at least one capillary tube, at least one fluid reservoir, at least one coating substrate, at least one capillary tube holder, and at least one traversing mechanism. The fluid reservoir provides a coating material to the capillary tube. The coating substrate receives a liquid coating film. The capillary tube holder holds the capillary tube, guiding movement of the capillary tube. The traversing mechanism drives the capillary tube holder or coating substrate to move.

By a capillary force provided between the coating material and the coating substrate, the capillary containing the coating material can wet the coating substrate. A coating operation is performed on the coating substrate by movement of the traversing mechanism, defining a patch pattern.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
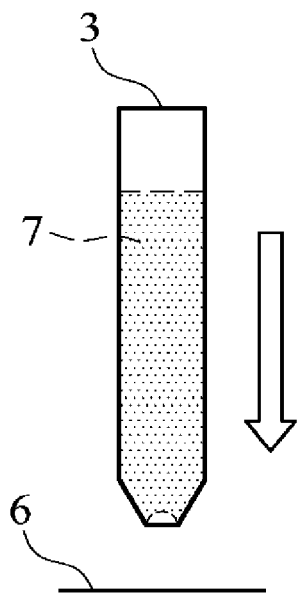
FIGS. 1A to 1F are schematic plane views showing a discontinuous capillary coating operation of the invention.
Figure 1B:
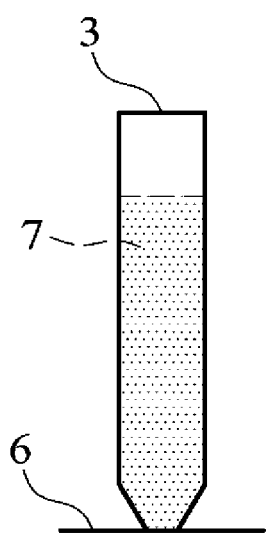
Figure 1C:
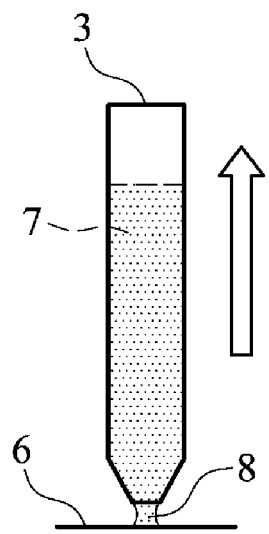
Figure 1D:
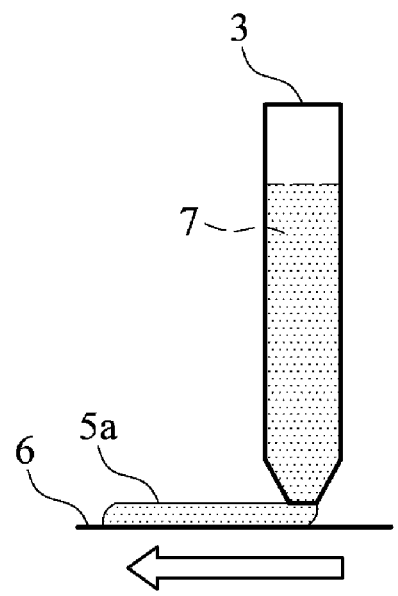
Figure 1E:
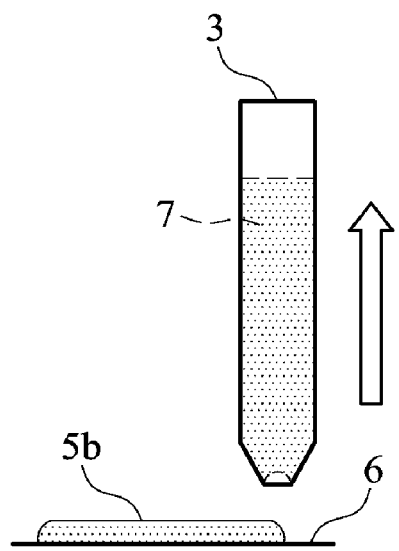
Figure 1F:
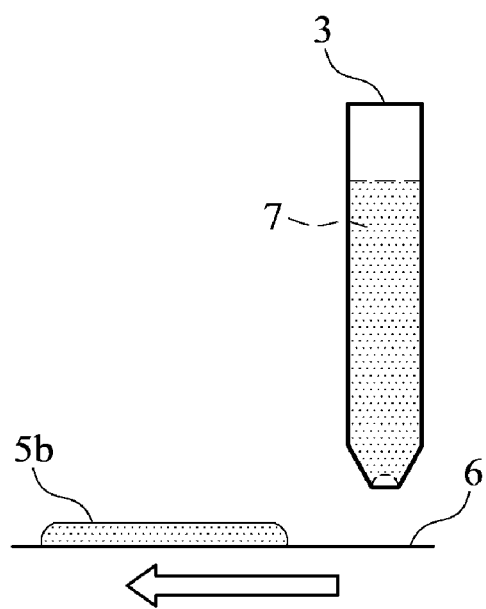

FIGS. 1A to 1F are schematic plane views showing a discontinuous capillary coating operation. As shown in FIG. 1A, a capillary tube 3 filled with a coating material 7 is moved downward. As shown in FIG. 2B, the capillary tube 3 contacts a coating substrate 6, enabling the coating material 7 to adhere to the coating substrate 6. As shown in FIG. 1C, the capillary tube 3 moves upward to a specific position, connecting the capillary tube 3 to the coating substrate 6 through a liquid bridge 8. As shown in FIG. 1D, the capillary tube 3 is moved with respect to and parallel to the coating substrate 6, coating the coating material 7 onto the coating substrate 6, and further forming a liquid film 5a. As shown in FIG. 1E, the capillary tube 3 is moved upward, cutting off the liquid bridge 8 between the coating material 7 and the coating substrate 6, and thus forming a micro-patch 5b. As shown in FIG. 1F, the capillary tube 3 is again moved with respect to the coating substrate 6, producing the next coated patch. In the aforementioned coating process, the length of the micro-patch 5b and the distance between the micro-patches 5b can be adjusted by adjusting the coating operation.

Figure 2A:
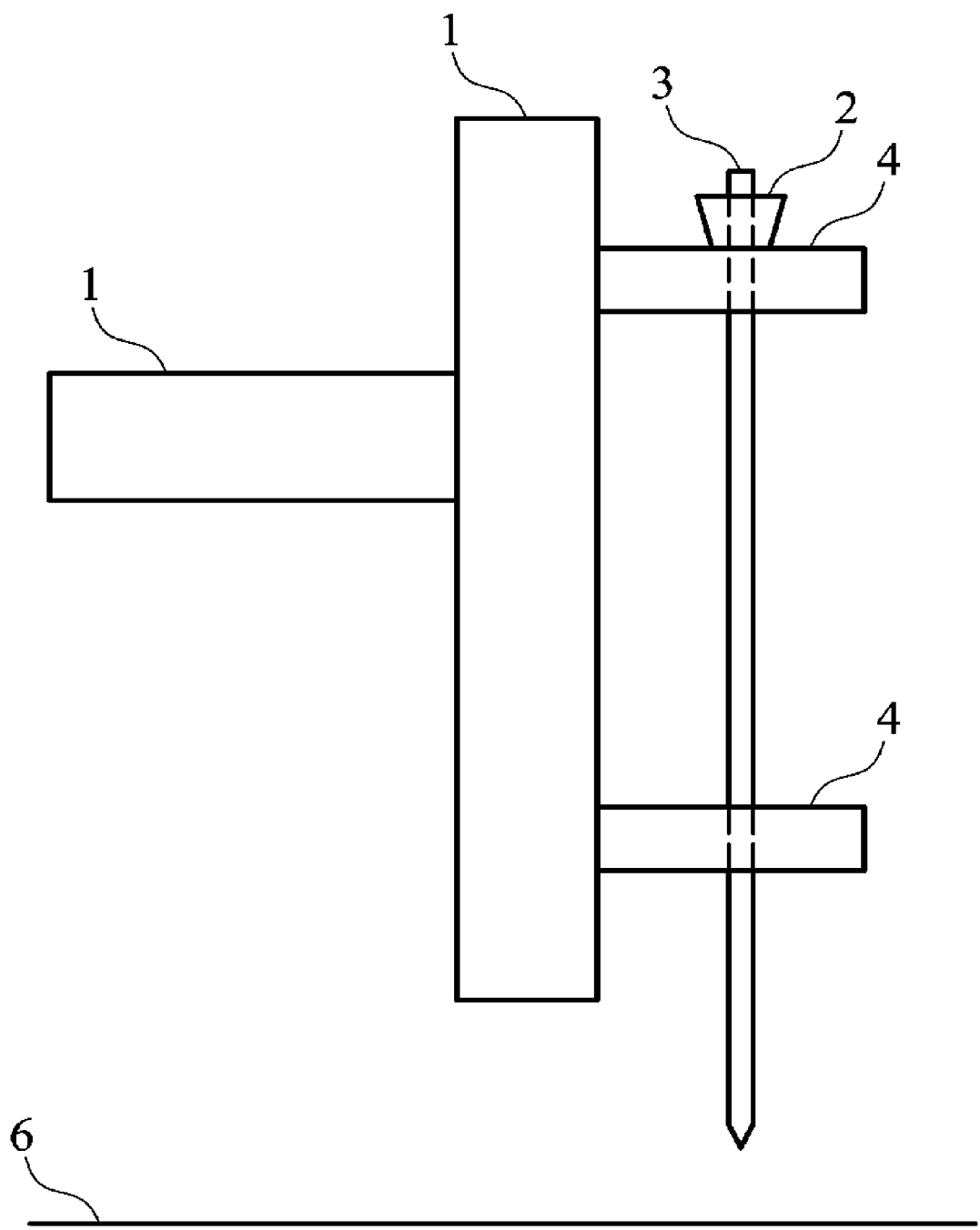
FIGS. 2A to 2C are schematic plane views of a discontinuous capillary coating device of the invention.
Figure 2B:
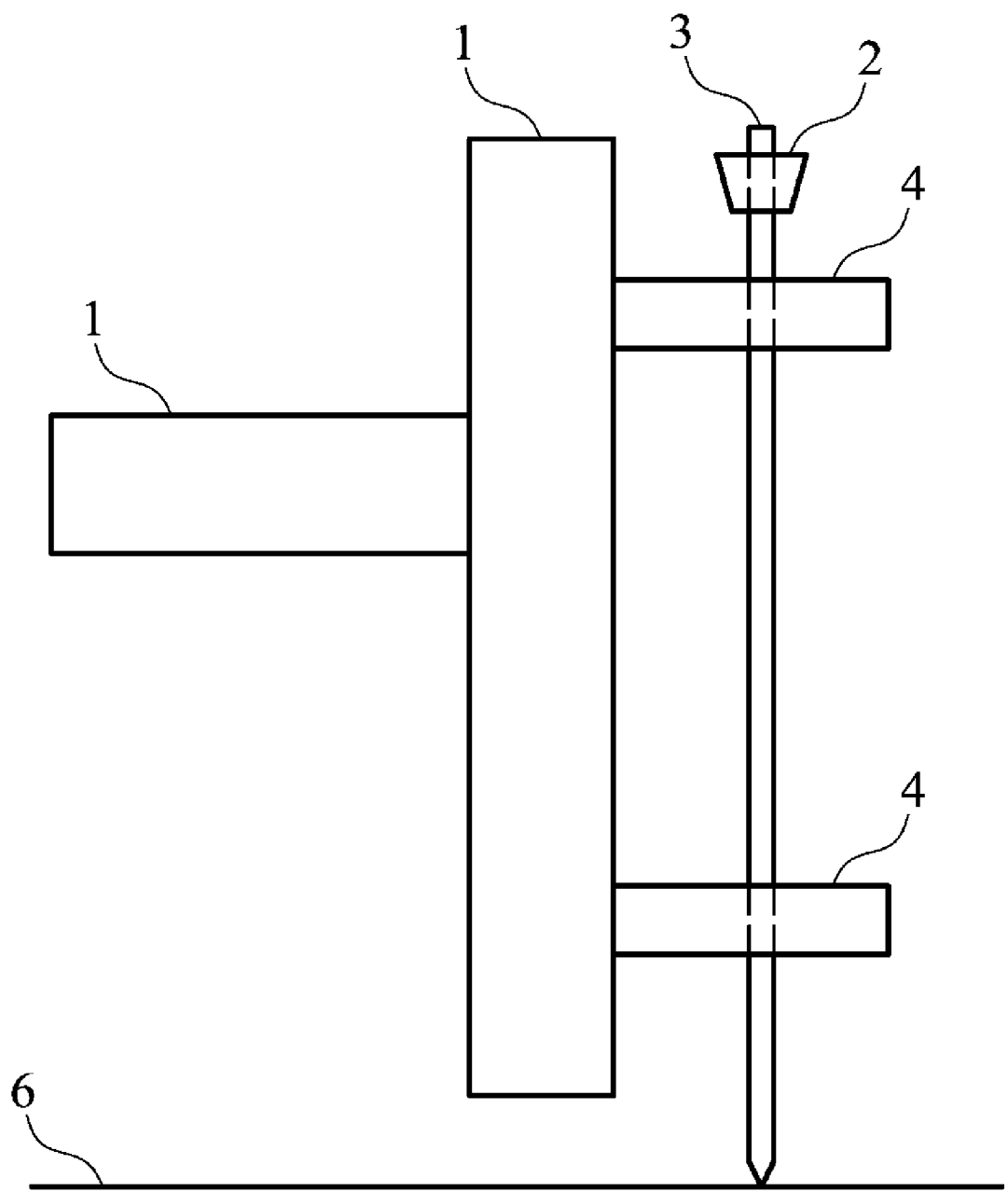
Figure 2C:
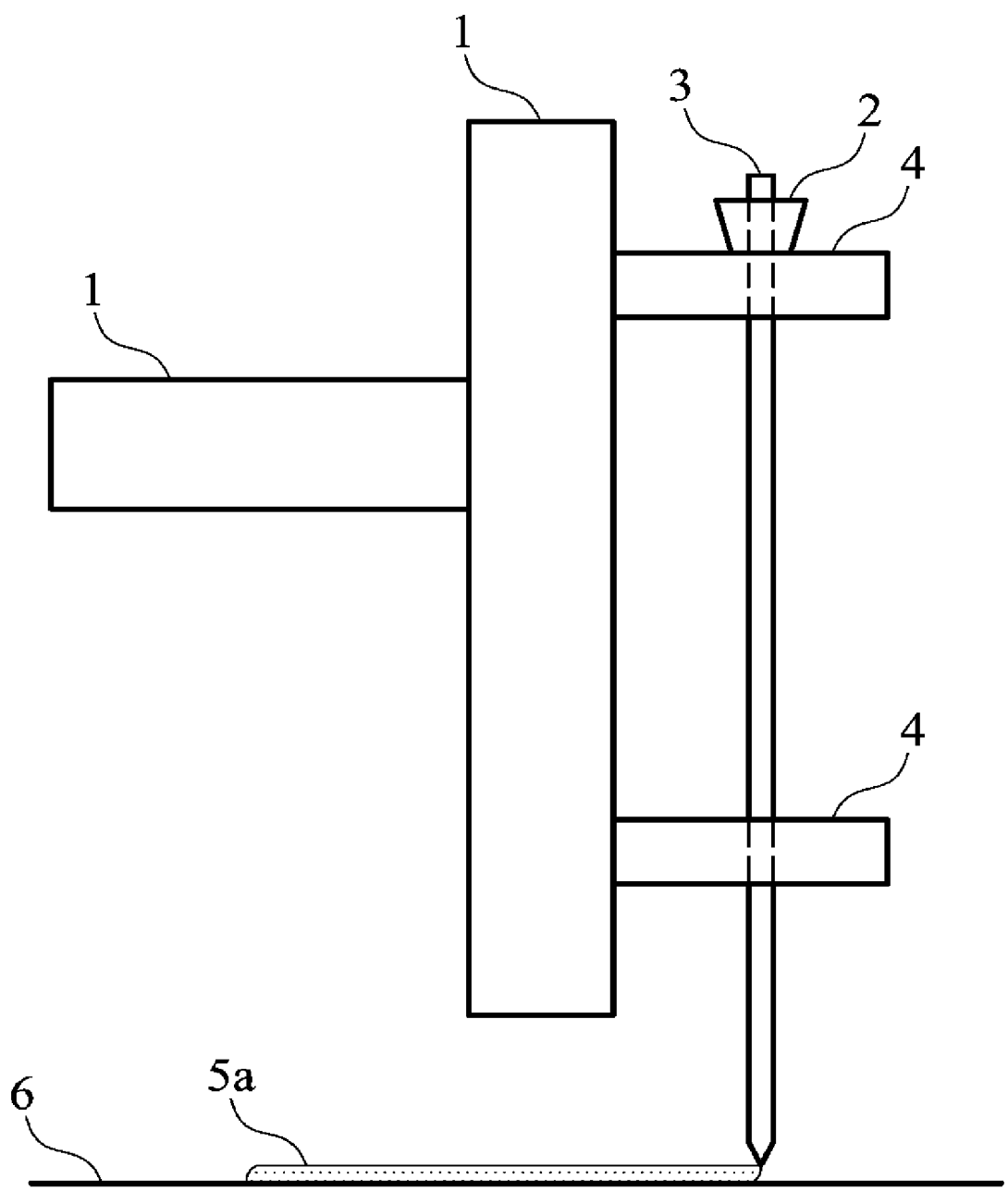

FIGS. 2A to 2C are schematic plane views of a discontinuous capillary coating device. The discontinuous capillary coating device comprises a displacing platform 1, a barricade 2, a capillary tube 3, two capillary tube holders 4, and a coating substrate 6. As shown in FIG. 2A, the capillary tube 3 is connected to the barricade 2 and is disposed on the capillary tube holders 4. Here, the capillary tube comprises a tapered outlet which comprises a polished flat opening, and the capillary tube holders 4 are fixed to the displacing platform 1. As shown in FIG. 2B, when the discontinuous capillary coating device contacts the coating substrate 6, upward and downward latitude is properly provided between the capillary tube 3 and the capillary tube holders 4, preventing damage of the capillary tube 3. As shown in FIG. 2C, the discontinuous capillary coating device produces a liquid film 5a on the coating substrate 6.

Figure 3A:
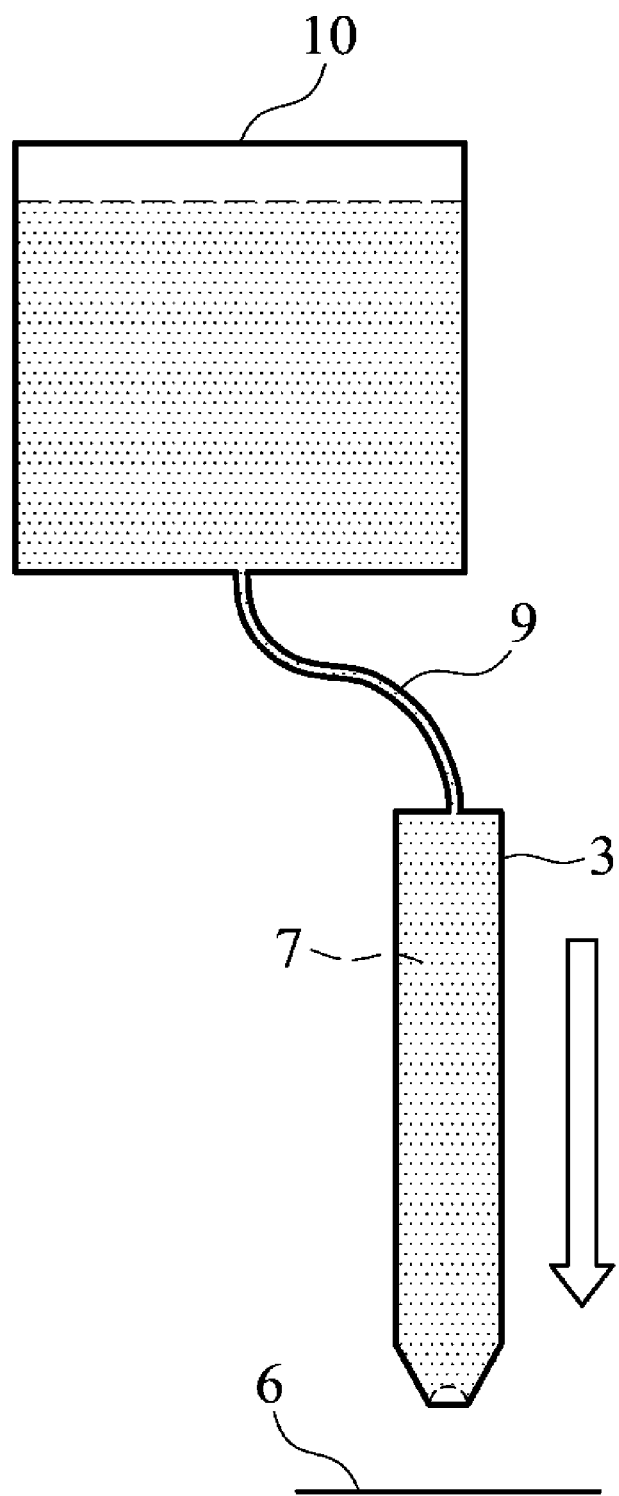
FIGS. 3A to 3D are schematic plane views showing a continuous capillary coating operation of the invention.
Figure 3B:
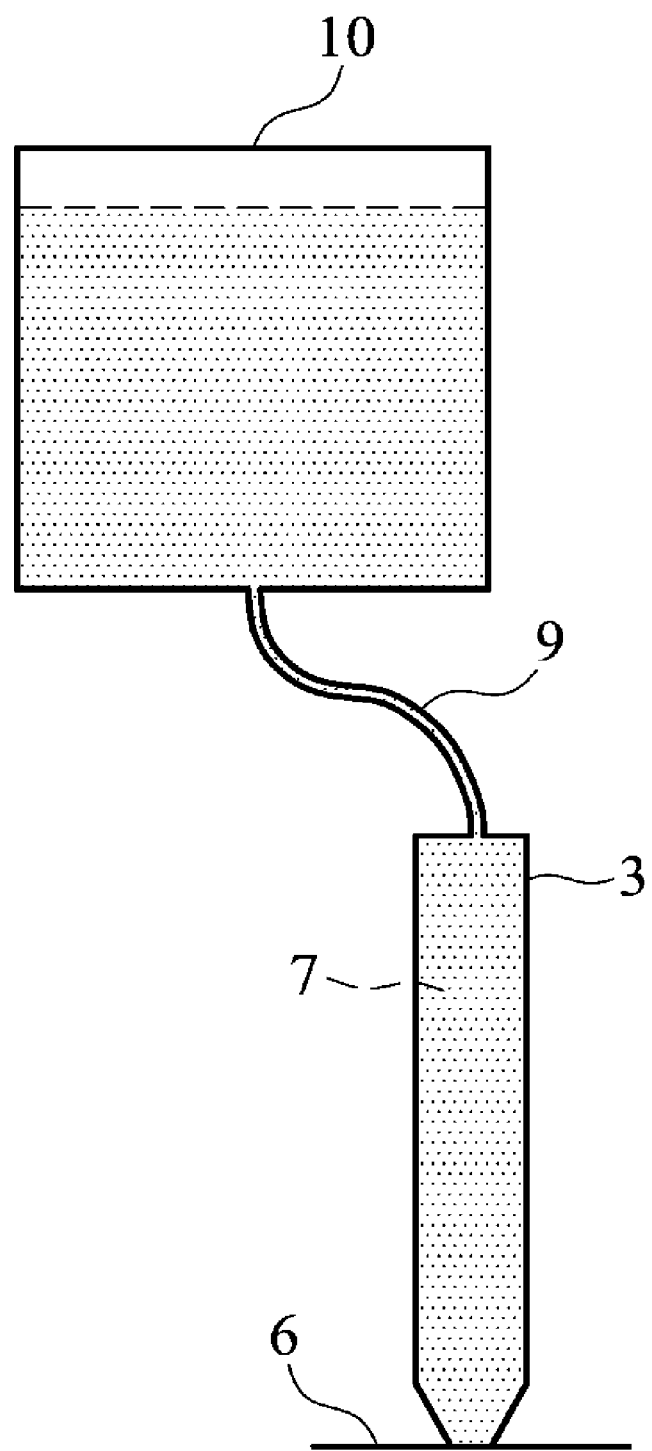
Figure 3C:
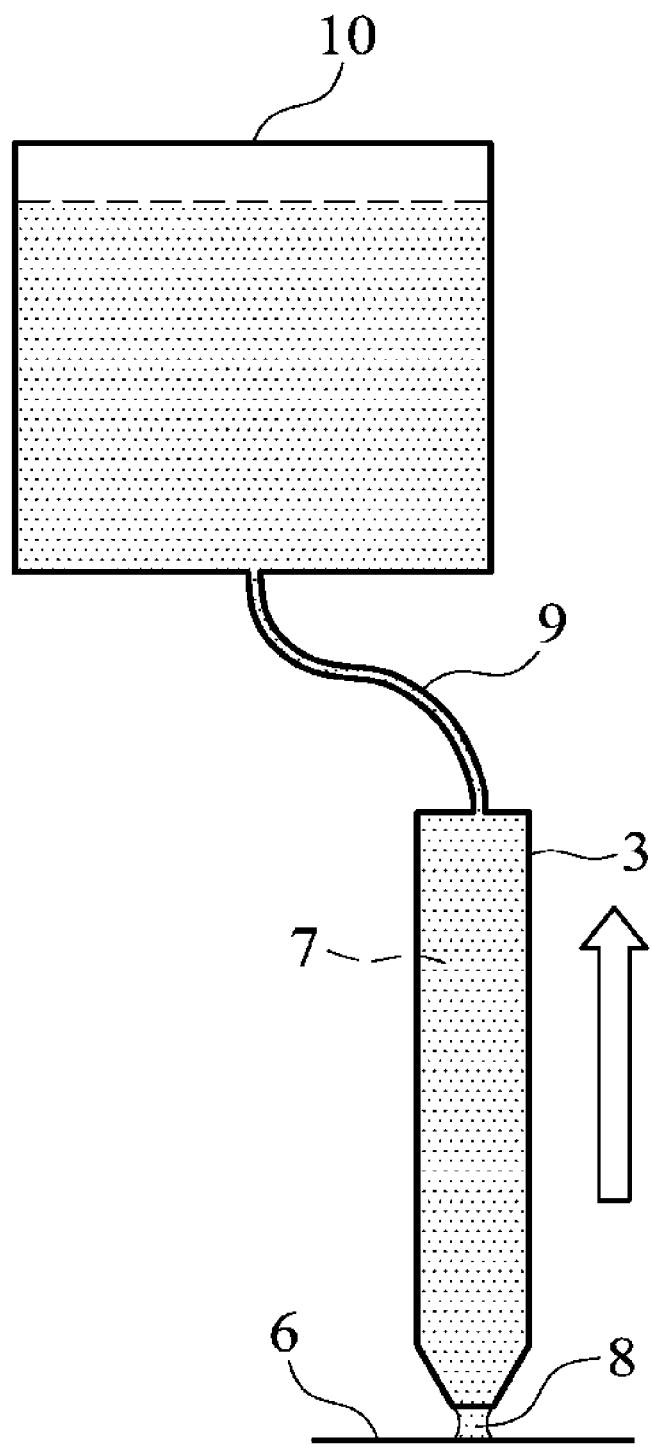
Figure 3D:
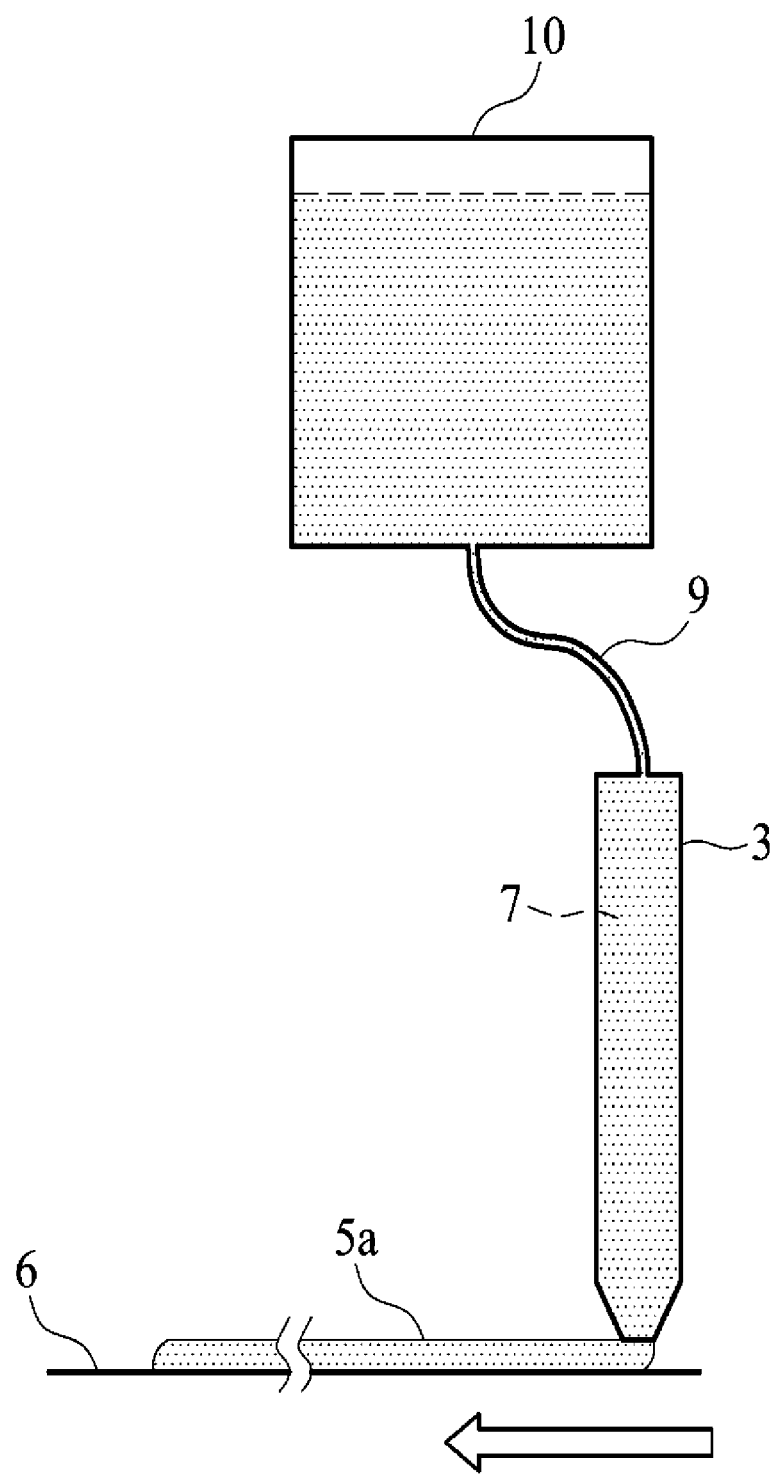

FIGS. 3A to 3D are schematic plane views showing a continuous capillary coating operation. The capillary tube 3 is connected to a fluid reservoir 10 through a connection member 9. Here, the fluid reservoir 10 can continuously supply the coating material 7 to the capillary tube 3. As shown in FIG. 3A, the capillary tube 3 is moved downward. As shown in FIG. 3B, the capillary tube 3 contacts the coating substrate 6, enabling the coating material 7 to adhere to the coating substrate 6. As shown in FIG. 3C, the capillary tube 3 is moved upward to a specific position, connecting the capillary tube 3 to the coating substrate 6 through a liquid bridge 8. As shown in FIG. 3D, the capillary tube 3 is moved with respect to and parallel to the coating substrate 6, coating the coating material 7 onto the coating substrate 6, and further forming a continuously coated liquid film 5a.

Accordingly, the traversing mechanism drives the capillary tube filled with the coating material to move with respect to the coating substrate. When contacting the coating substrate, the coating material adheres to the coating substrate by a capillary force provided there between, thereby performing the coating operation. By controlling relative movement between the capillary tube and the coating substrate, various continuous stripe-like liquid films or discontinuous patch-like liquid films can be generated. Furthermore, the patch pattern can be defined by the relative movement between the capillary tube and the coating substrate.

By the capillary force provided between the coating material and the coating substrate, the capillary tube filled with the coating material can wet the coating substrate. The coating operation is performed on the coating substrate by movement of the traversing mechanism, coating various discontinuous liquid micro-patches on the coating substrate. For example, during manufacture of a color filter, patterns with R, G, and B patches can be generated on a coating substrate thereof.

Specifically, the coating operation is performed using surface tension between the coating material received in the capillary tube and the coating substrate, such that the coating material can be coated on the coating substrate.

In conclusion, the disclosed methods can solve the problem of low utility rate of the raw materials provided by the spin coating and exposure development methods and can thus be applied to coating of large panels. Moreover, the disclosed techniques can solve the problem of low productivity provided by the ink-jet printing method. Additionally, compared with the stamping method, the disclosed methods can enhance the variability of the pattern. Furthermore, compared with the stripe coating and discontinuous micro-patch coating methods, the disclosed methods can provide reduced manufacturing costs. In summary, as equipment and manufacturing costs are reduced and productivity is enhanced, the disclosed methods or techniques can be applied to the manufacture of the large panels and designing of complicated micro-structural patterns.

Moreover, the capillaries of the disclosed devices directly perform the coating operation. The coated patterns can be determined by the relative movement between the capillaries and the coating substrates. The separated distance between the capillaries of the disclosed devices can be freely adjusted, such that the coated patterns can be provided with enhanced variability, as compared with those generated by the conventional stamping and stripe coating methods. Moreover, compared with the conventional inkjet printing method, the disclosed methods or techniques do not require high positioning precision and can enhance productivity.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A discontinuous capillary coating method, comprising:
providing at least one capillary tube, at least one capillary tube holder, at least one traversing mechanism, and at least one coating substrate;
filling the capillary tube with a coating material and disposing the capillary tube on the capillary tube holder;
activating the traversing mechanism to enable the capillary tube to approach and contact the coating substrate, allowing the coating material in the capillary tube to contact the coating substrate, wherein the coating material is capable of wetting the coating substrate;
moving the capillary tube holder upward to a specific position, thereby connecting the capillary tube to the coating substrate through a liquid bridge of the coating material;
moving the capillary tube holder or coating substrate by the traversing mechanism, wherein a coating operation is performed by capillary action, and a liquid film on the coating substrate is formed; and
activating the traversing mechanism to separate the capillary tube from the coating substrate, cutting off the liquid bridge between the coating material and the liquid film, and forming at least one discontinuous liquid film.

2. The discontinuous capillary coating method as claimed in claim 1, wherein the capillary tube is replaceable, and the size of an outlet of the capillary tube matches the size of the liquid film.

3. The discontinuous capillary coating method as claimed in claim 1, wherein the moving speed of the traversing mechanism is adjustable.

4. A continuous capillary coating method, comprising:
providing at least one capillary tube, at least one capillary tube holder, at least one fluid reservoir, at least one traversing mechanism, and at least one coating substrate;
disposing the capillary tube on the capillary tube holder;
connecting the capillary tube to the fluid reservoir;
activating the traversing mechanism to enable the capillary tube to approach and contact the coating substrate, allowing a coating material filled in the capillary tube to contact the coating substrate, wherein the coating material is capable of wetting the coating substrate;
moving the capillary tube holder upward to a specific position, thereby connecting the capillary tube to the coating substrate through a liquid bridge of the coating material; and
moving the capillary tube holder or coating substrate by the traversing mechanism, wherein a coating operation is performed by capillary action, and a continuous liquid film is formed.

5. The continuous capillary coating method as claimed in claim 4, wherein the capillary tube is replaceable, and the size of an outlet of the capillary tube matches the size of the liquid film.

6. The continuous capillary coating method as claimed in claim 4, wherein the moving speed of the traversing mechanism is adjustable.

* * * * *